US008633964B1

(12) United States Patent  
Zhu

(10) Patent No.: US 8,633,964 B1  
(45) Date of Patent: Jan. 21, 2014

(54) GENERATING VIDEO FROM PANORAMIC IMAGES USING TRANSITION TREES

(75) Inventor: Jiajun Zhu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 417 days.

(21) Appl. No.: 12/891,267

(22) Filed: Sep. 27, 2010

Related U.S. Application Data

(60) Provisional application No. 61/266,761, filed on Dec. 4, 2009.

(51) Int. Cl.  
*H04N 7/00* (2011.01)

(52) U.S. Cl.  
USPC .......................................................... 348/36

(58) Field of Classification Search  
USPC .................................................... 348/36–41  
See application file for complete search history.

(56) References Cited

U.S. PATENT DOCUMENTS

| | | | |
|---|---|---|---|
| 6,788,333 | B1 | 9/2004 | Uyttendaele et al. |
| 2002/0049534 | A1* | 4/2002 | Yuda et al. ................. 701/209 |
| 2008/0106593 | A1* | 5/2008 | Arfvidsson et al. ........... 348/39 |
| 2008/0129818 | A1* | 6/2008 | Miller ........................... 348/36 |
| 2008/0253685 | A1 | 10/2008 | Kuranov et al. |
| 2009/0063424 | A1* | 3/2009 | Iwamura et al. ................ 707/3 |
| 2010/0250120 | A1* | 9/2010 | Waupotitsch et al. ....... 701/207 |
| 2012/0202428 | A1* | 8/2012 | Mirbaha et al. .............. 455/41.2 |

* cited by examiner

*Primary Examiner* — Joseph Ustaris  
*Assistant Examiner* — Talha Nawaz  
(74) *Attorney, Agent, or Firm* — Sterne, Kessler, Goldstein & Fox P.L.L.C.

(57) ABSTRACT

Methods and systems for generating video from panoramic images using transition trees are provided. According to an embodiment, a method for generating a video from panoramic images may include receiving a transition tree corresponding to a current panoramic image from a server. The method may also include determining a path of the transition tree to a next panoramic image based on a user navigation request. The method may further include requesting and receiving a video chunk from the server for each edge of the determined path of the transition tree. The method may also include displaying the requested video chunks in sequence according to the transition tree. According to another embodiment, a system for generating a video from panoramic images may include a transition tree module and a video display module.

24 Claims, 7 Drawing Sheets

GENERATING VIDEO FROM PANORAMIC IMAGES USING TRANSITION TREES

CROSS REFERENCE TO RELATED APPLICATIONS

This application claims the benefit of U.S. Provisional Appl. No. 61/266,761, filed Dec. 4, 2009, which is hereby incorporated by reference in its entirety.

FIELD OF THE INVENTION

Embodiments relate to mapping services and generating videos.

BACKGROUND OF THE INVENTION

With online mapping services and GPS-enabled devices readily available, users have the ability to find mapping information, such as driving directions, quickly and conveniently. Some online mapping services and GPS-enabled devices provide road and/or satellite imagery to enhance the quality of the driving directions. For example, online mapping services, such as GOOGLE Maps, provide panoramic images of street level scenery at different locations. When virtually navigating from one location to another in the mapping service, panoramic images may be displayed as video to provide a more scenic experience during virtual navigation.

However, different panoramic images are taken from different camera positions, at different times of day and under different lighting conditions. Often, panoramic images used for video during user navigation do not present a continuous visual experience. For example, video during virtual navigation may present images captured during a sunny day interleaved with images captured on a dark overcast day. Current methods for displaying video of panoramic images also require transmission of large video clips.

BRIEF SUMMARY

Embodiments relate to generating video from panoramic images, each panoramic image corresponding to a geographical location, coordinate location or map location. According to an embodiment, a system for generating a video from panoramic images may include a transition tree module configured to receive a transition tree corresponding to a current panoramic image from a server. The transition tree provides two or more decision paths for transitioning to nearby panoramic images. Nearby panoramic images may include panoramic images of locations near the location associated with the current panoramic image. The transition tree module may also be configured to determine a path of the transition tree to a next panoramic image based on a user navigation request and request a video chunk from the server for each edge of the determined path of the transition tree. The system may also include a video display module configured to receive the requested video chunks from the server and display the requested video chunks on a display. The requested video chunks may be displayed in sequence according to the transition tree.

According to another embodiment, a method for generating a video from panoramic images may include receiving a transition tree corresponding to a current panoramic image from a server. The method may also include determining a path of the transition tree to a next panoramic image based on a user navigation request. The method may further include requesting a video chunk from the server for each edge of the determined path of the transition tree and receiving the requested video chunks from the server. Video chunks may be a portion of video constructed from one or more panoramic images. The method may include displaying the requested video chunks in sequence according to the transition tree. In a further embodiment, the method may include displaying each received video chunk upon arrival from the server and the displaying may begin prior to receiving all requested video chunks from the server.

Further embodiments, features, and advantages of the invention, as well as the structure and operation of the various embodiments of the invention are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

As used herein, panoramic images can include, but are not limited to, images covering a wide angle field of view. This can include spherical panoramic images that capture an image about a focal point which is at a center with a wide angle of view about the center. Pixels within a spherical panoramic image can further be represented on a surface of a three-dimensional sphere (this can be an entire surface of a 3D sphere or just a portion depending upon the image). Cylindrical, arcuate, rectilinear, polygonal or other types of panoramic images can also be used. The panoramic images may be captured along a route, such as, for example, at street level, at a floor in a building, or at a flying altitude.

Figure 1:
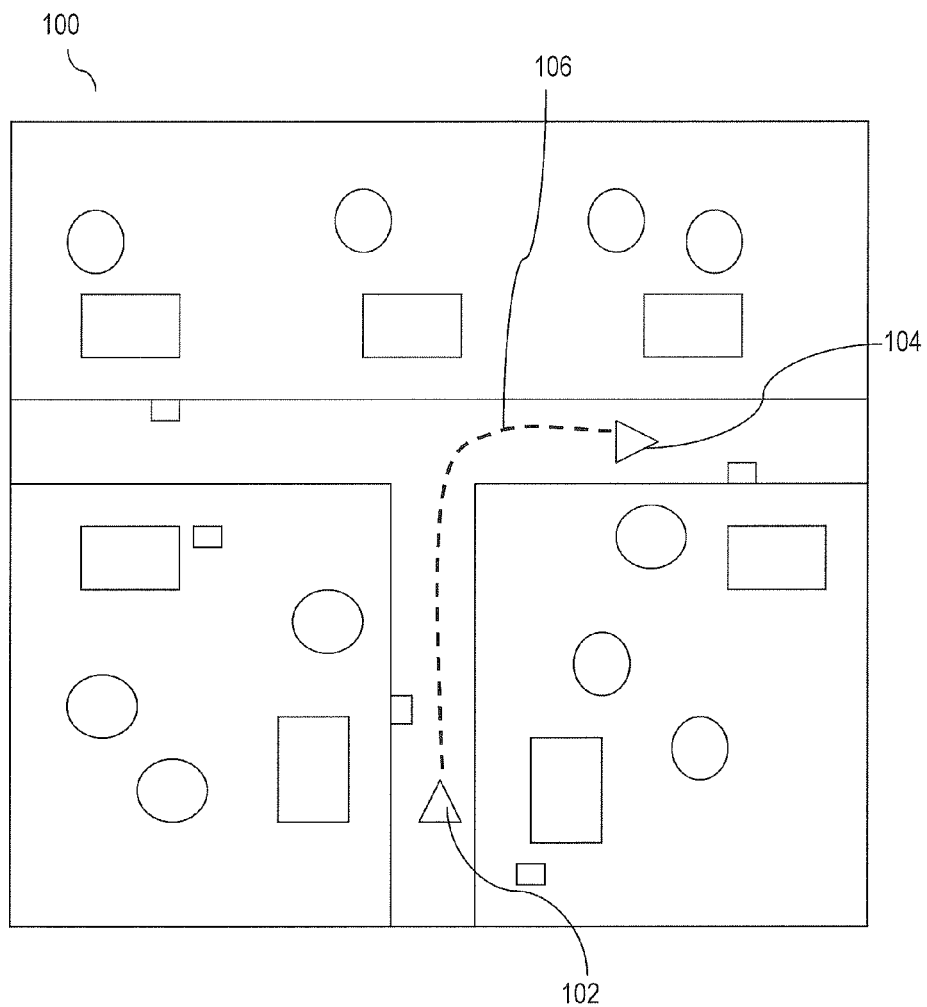
FIG. 1 is a representation of a map showing a navigation path according to an embodiment.
Figure 2:
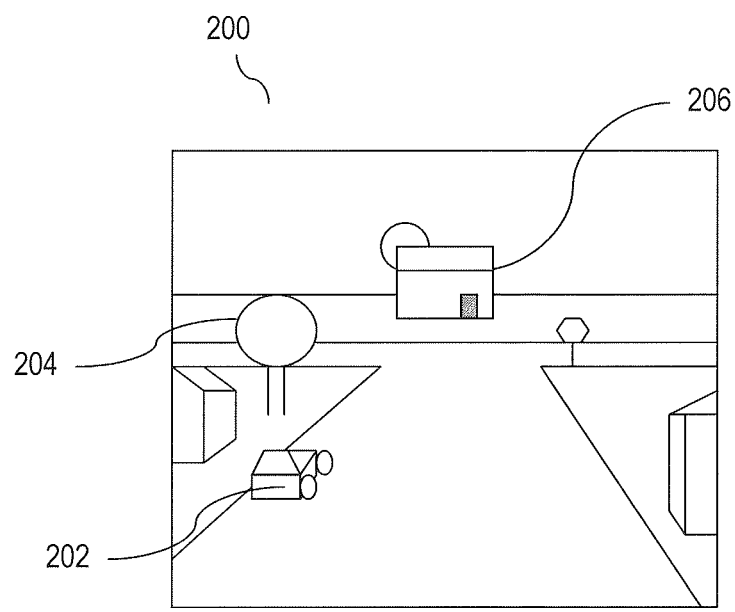
FIG. 2 illustrates an example panoramic image according to an embodiment.
Figure 3:
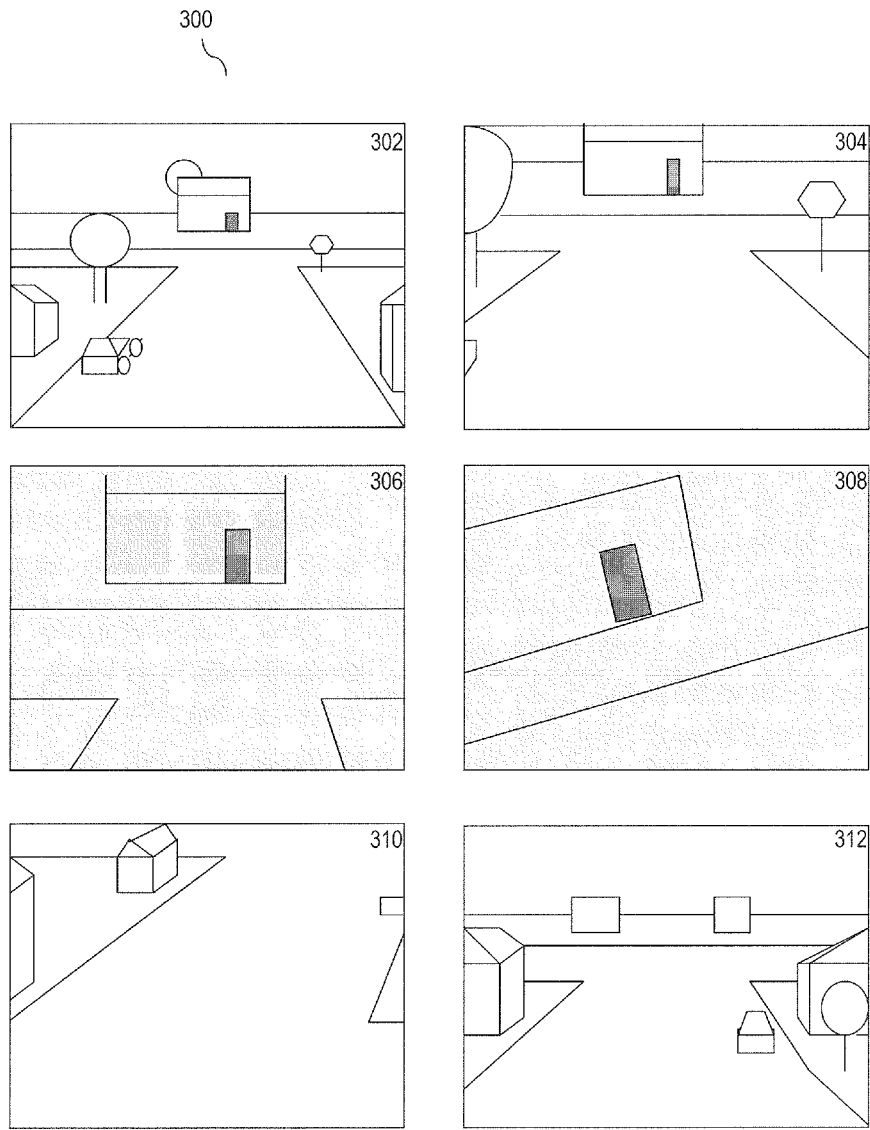
FIG. 3 illustrates an example sequence of video with discontinuous imagery.

Online mapping services, such as GOOGLE Maps and GOOGLE Street View, provide panoramic images of street level scenery at different locations. When virtually navigating from one location to another within such an application, panoramic images may be displayed as video to provide a more scenic experience during virtual navigation. For example, FIG. 1 shows a map 100 representing a current location 102 of a user within a neighborhood. Map 100 may contain various geographical overlays that include road data, satellite imagery, and local business information. FIG. 2 shows a street level panoramic image corresponding to location 102, including some typical objects seen in an image, such as a parked car 202, tree 204 and house 206. If the user chooses a new location 104 at a distance from the user's current location on a map, the user may view video showing surrounding imagery as if the user were traveling down the street, turning right at the intersection and continuing down the street along navigation path 106 to new location 104. This video is represented as a series of diagrams in FIG. 3 representing panoramic images 302-312, showing traveling down the street (images 302-306), turning right at the corner (images 308-310), and proceeding down the street to new location 104 (image 312).

However, different panoramic images are taken from different camera positions, at different times of day and under different lighting conditions. Often, panoramic images used for video during user navigation do not present a continuous visual experience. For example, images 306 and 308 appear darker as if taken on an overcast or rainy day while the remaining images were taken on a sunny day. Because of the different conditions in which the images were taken, the navigation path presents a series of discontinuous images, which detracts from the user experience. Current methods for displaying video of panoramic images also require transmission of large video clips. Such a video clip may include a video of the whole route.

Figure 5:
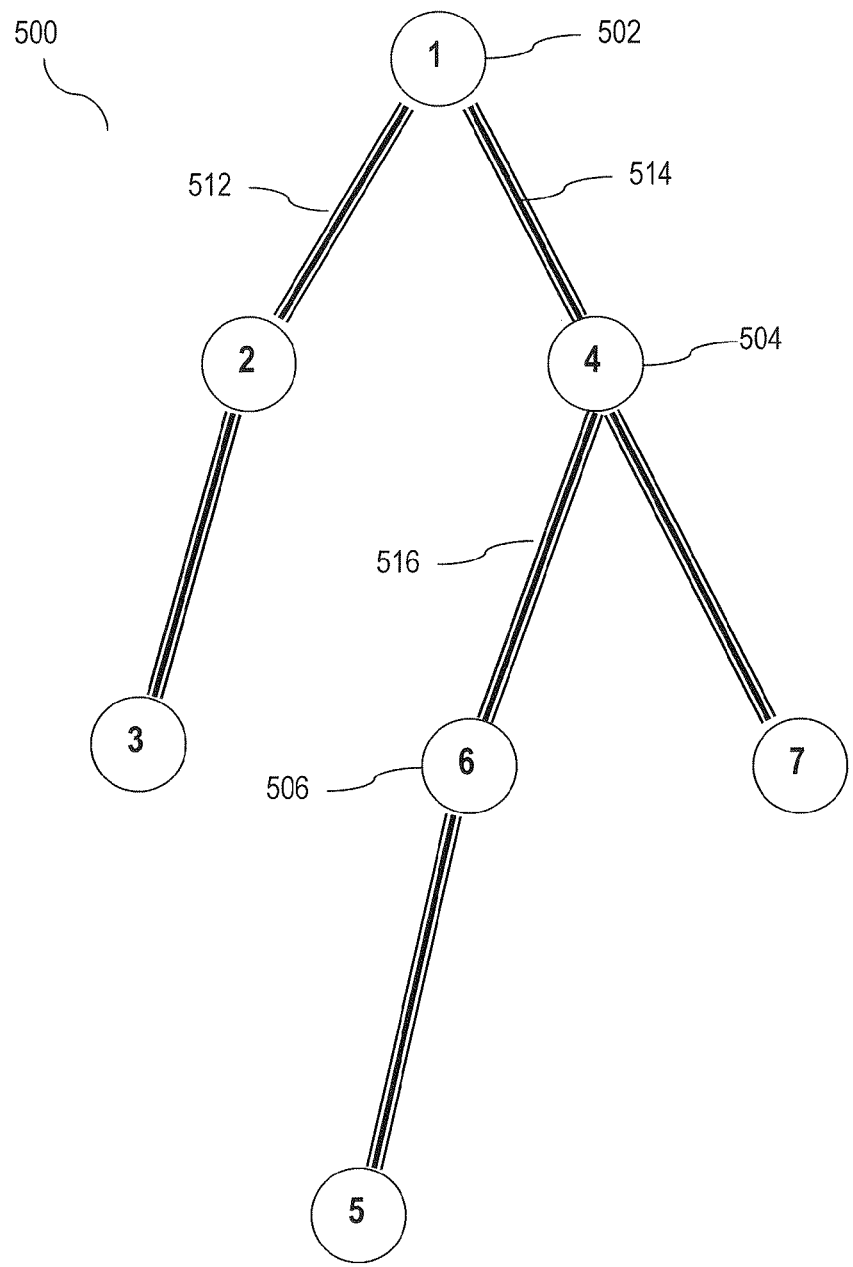
FIG. 5 illustrates an example transition tree for a panoramic image according to an embodiment.

Embodiments described below use transition trees to generate video from panoramic images. This can provide for more continuous and realistic imagery. A transition tree may be associated with each panoramic image. A transition tree may include two or more paths or branches, as shown in FIG. 5. According to example transition tree 500, root node 1 represents a current panoramic image for the current location. Nodes 2-7 represent nearby panoramic images, or panoramic images corresponding to nearby locations. For example, panoramic images corresponding to nodes 502, 504 and 506 may include various panoramic images of locations within a 100 m radius of the current location.

In example transition tree 500, nodes 1-7 represent panoramic images. Edges, such as edges 512-516, represent video chunks for transitioning from one panoramic image to another. In some cases, a video chunk may include multiple panoramic images and any intermediate frames. In other cases, a video chunk may include one panoramic image. Video chunks may be formed from whole panoramic images. Video chunks may also be created by merging or blending panoramic images. In another embodiment, edge 512 may include multiple video chunks or a portion of a video chunk.

The paths represent possible sequences of images for generating video. For example, a video may be generated for the transition from panoramic image 502 to panoramic image 504 by way of a video chunk for edge 514. It should noted that the decision paths of example transition tree 500 do not have to strictly correspond to road or physical navigation routes. The nodes represent video transitions to other panoramic images.

According to an embodiment, a transition tree may be associated with each panoramic image. Therefore, when a video has transitioned to the next node, for example panoramic image 504, a new transition tree may be received for panoramic image 504. It is possible in some cases for a new transition tree to be a modified tree or a referenced tree. The new transition tree may show similar remaining paths or new paths not suggested previously. In some cases, these new paths may be the result of new additions or a recent processing of a transition tree. Transition trees provide for flexible and dynamic transition and for efficient and accurate real-time video generation.

Figure 4:
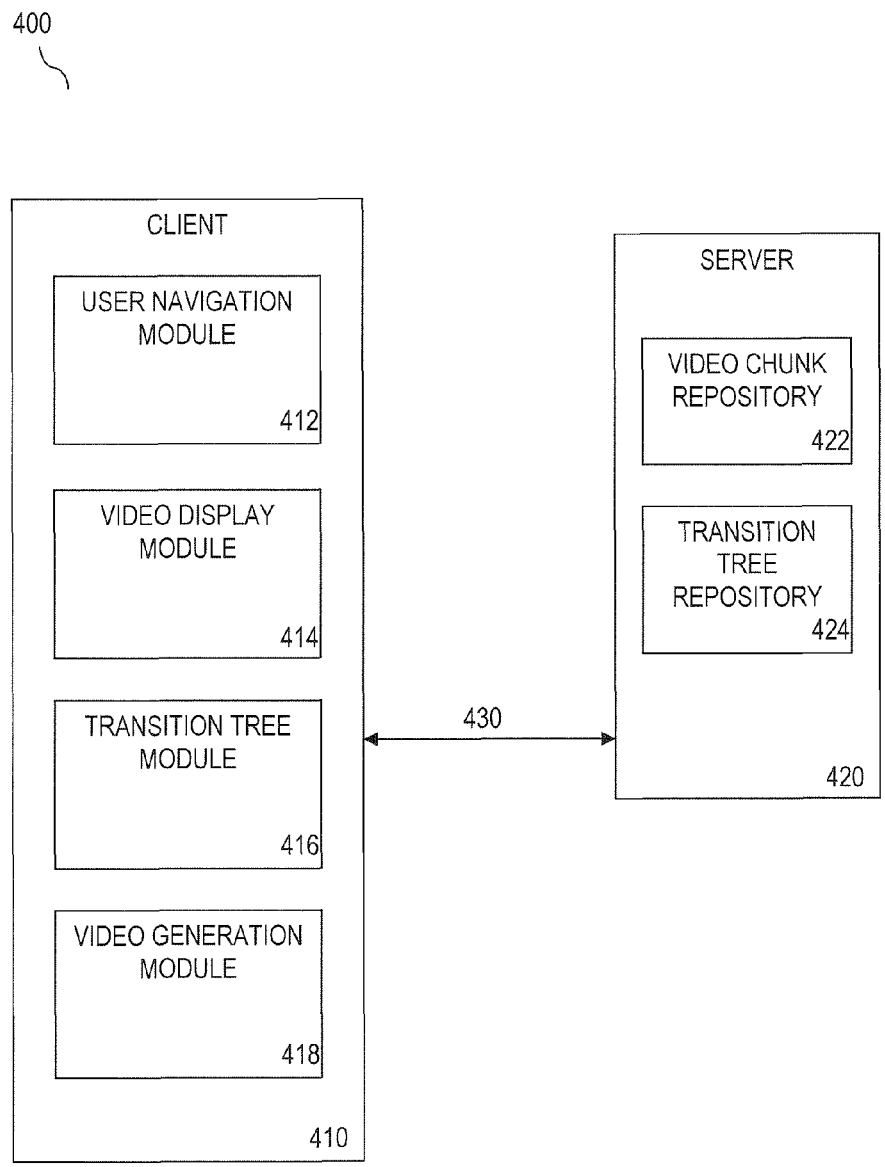
FIG. 4 is an architecture diagram of a system for generating videos from panoramic images according to an embodiment.

FIG. 4 is an architecture diagram of a system for generating a video from panoramic images according to an embodiment of the present invention. FIG. 4 shows system 400. System 400 includes a client 410 and a server 420 coupled by one or more networks 430. Each of client 410 and server 420 may be implemented on a computing device. Examples of computing devices include, but are not limited to, a computer, workstation, distributed computing system, computer cluster, embedded system, stand-alone electronic device, networked device, mobile device (e.g. mobile phone or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and graphical user interface display. In some embodiments, client 410 and server 420 may be implemented on separate computing devices at the same or at different locations. In other cases, client 410 and server 420 may be implemented on the same computing device.

Network 430 may be any network or combination of networks that can carry data communication. Such a network 430 can include, but is not limited to, a local area network, medium area network, and/or wide area network such as the Internet. Network 430 can support protocols and technology including, but not limited to, World Wide Web protocols and/or services. Intermediate web servers, gateways, or other servers may be provided between components of system 400 depending upon a particular application or environment.

According to an embodiment, client 410 may include user navigation module 412, video display module 414, transition tree module 416 and video generation module 418. Server 420 may include video chunk repository 422 and transition tree repository 424. As used herein, the term "repository" includes, but is not limited to, table databases, hierarchical databases, network databases, relational databases, dimensional databases, object-oriented databases, or any other deposit or repository for data. In some cases, server 420 may represent multiple servers with resources spread over the multiple servers.

User navigation module 412 may be configured to provide a user with an interface for viewing images and videos and requesting information on locations and navigation paths, according to an embodiment. User navigation module 412 may provide navigation tools familiar to users of applications such as GOOGLE Maps and familiar to those of ordinary skill in the art. In one exemplary embodiment, user navigation module 412 may be configured to provide a user interface and navigation tools in a browser. For example, a browser may be a web browser or other type of browser for browsing content. The browser can send a request over network 430 to server 420 and receive a response from server 420. As an example, not to limit the present invention, the request may be a hypertext transfer protocol (HTTP) request. The HTTP request may contain parameters entered by a user using a user interface. The response may be an HTTP response. An HTTP response may contain web content, such as a hypertext markup language (HTML), images, video, or multimedia content. In some embodiments, navigation module 412 may use a combination of markup and scripting elements, such as, for example, HTML and/or JavaScript. A user interface can also be executed as a script within a browser, as a plug-in within a browser, or as a program which executes within a browser plug-in, such as the ADOBE (MACROMEDIA) Flash plug-in. Navigation module 412 may also operate a user interface as a standalone application in other embodiments.

A mapping system may also be used according to another embodiment. An example mapping system is described in greater detail in U.S. Pat. No. 7,158,878, entitled "Digital Mapping System," which is incorporated by reference herein in its entirety. This example mapping system is illustrative and not intended to limit navigation module 412 or any corresponding user interface. User navigation module 412 may coordinate display of images and video with video display module 414.

According to a further embodiment, server 420 may include a web server or may be coupled to communicate with a web server at the same or a different location. A web server is a software component that responds to an HTTP request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include HTML, extensible markup language (XML), documents, videos, images, audio, multimedia features, or any combination thereof. This example is strictly illustrative and does not limit the present invention.

According to an embodiment, transition tree module 416 may be configured to receive panoramic images and transition trees corresponding to panoramic images. Transition trees may be received in response to specific requests or received automatically with each received panoramic image. Transition trees may be received from transition tree repository 424 of server 420.

According to an embodiment, server 420 or another server coupled to server 420 may be configured to generate transition trees for transition tree repository 424 according to available panoramic images and best paths for transitioning to other nearby panoramic images. Server 420 may interpolate successive images to generate interpolated images. These interpolated images may be inserted as intermediate frames in a video chunk. Server 420 may use a simple blending or a complex optical flow-based approach that accounts for lighting, focal length, camera angle, or other camera parameters for the interpolation.

In some embodiments, information about panoramic images and transition trees may be stored as metadata. For example, for each panoramic image, the metadata may indicate the geographical or map location of the respective panoramic image. Furtheimore, the metadata may also include the time and date that each panoramic image was captured, weather or lighting conditions at the time of capture, the position of the camera, and any other information relevant for selection. In an embodiment, transition trees may be generated based on panoramic image metadata, continuity of images, image conditions, navigation route requirements, distance, or considering the pros and cons of using certain images over other images.

Metadata may also be associated with transition trees, according to an embodiment. In some cases, location information, immediate neighbor nodes, video chunk information and sequence information may be associated with each node of a transition tree. For example, metadata for nodes 1-7 of transition tree 500 may include metadata as shown in Table 1 below.

TABLE 1

| NODE | METADATA |
|------|----------|
| 1 | Previous_Node = −1<br>Latitude = 32.23<br>Longitude = 12.30<br>Frame_sequence = {empty} |
| 2 | Previous_Node = 1<br>Latitude = 32.24<br>Longitude 12.31<br>Frame_sequence = {<br>  chunk = 434145<br>  first_frame = 3<br>  last_frame = 6<br>} |
| ... | ... |
| 7 | Previous_Node = 4<br>Latitude = 32.20<br>Longitude 12.33<br>Frame_sequence = {<br>  chunk = 434509<br>  first_frame = 0<br>  last_frame = 3<br>} |

According to an embodiment, transition tree module 416 may be configured to determine a path of a transition tree based on a user navigation request. In some cases, a path may be determined by back tracing from a destination node back to a current or root node. In other cases, a path may be determined based on timestamps of panoramic images associated with nodes of the transition tree. For example, early morning panoramic images may be more closely associated with other daytime images. A daytime shot from another nearby image may be selected over an evening shot in a sequence of otherwise daytime images.

According to some embodiments, a path of a transition tree may be determined based on lighting conditions of panoramic images. For example, images 306 and 308 of the video sequence represented by FIG. 3 are taken under poorer lighting conditions than the rest of the images. Images 606 and 608 in FIG. 6 may be selected over images 306 and 308 due to better lighting conditions, even though image 608 appears to be from a different location or camera position than image 308. The result of this path selection is a more continuous visual experience, as shown in representative generated video 600 in FIG. 6. Generated video 600 is an example representation of video generated from requested video chunks received by video display module 412 or video generation module 418.

In other embodiments, a transition path may be determined based on camera positions of panoramic images. Camera positions may vary based on height above the ground, zoom levels, camera angles, proximity to objects, sides of a street, or internal positions within a building. In some cases, a transition path may be determined based on the resolution of images or the length or number of video sequences required to complete the path. A shortest path may also be selected based on a number of reasons, including the number and size of video chunks or a period of slower traffic on network 430. Other determinations may be based on other factors such as image gaps, residential streets vs. highways, privacy concerns or any other relevant factors.

Transition tree module 416 may be configured to request video chunks from server 420 based upon the determined path of a transition tree according to an embodiment. One or more video chunks may be requested for an edge of the transition tree. Video chunks may have identifiers for use in handling video chunks. In some cases, video chunks may be requested using an identifying uniform resource locator (URL) that may include a chunk id and a format.

According to another embodiment, video chunks may be prefetched, such as during an idle time. Prefetched video chunks may be requested in advance of a final transition tree path determination. In most cases, panoramic images and video chunks relating to immediate edges and nodes of a transition tree may be prefetched. For example, if a user navigation is halted, even for a brief moment on an image. The current panoramic image may be established as root node 1 of a transition tree associated with the image. Using transition tree 500 as an example, video chunks for edges 512 and 514 may be prefetched in advance of a future user navigation and any future path determinations. A current viewing angle may also be taken into consideration. Prefetching may also be enabled or disabled based on available client bandwidth. In some cases, path determinations may consider available prefetched video chunks.

Video display module 414 may be configured to receive video chunks from server 420 or from another receiving component according to an embodiment. Video display module 414 may also be configured to display requested video chunks in sequence according to a transition tree or a determined transition tree path. In some case, video chunks may be displayed upon arrival from server 420. Video display module 414 may be configured to display video chunks and/or panoramic images on a display. The displaying may begin prior to receiving all video chunks from server 420. In some cases, video generation module 418 may be used to collect and generate video for display.

Embodiments of the invention provide many advantages. Receiving video in specified and targeted chunks provides for shorter compression and transmission times than when using larger video clips covering whole routes or large portions of a route. This also provides for more flexibility. Targeted images are requested rather than all images in the area. Furthermore, in most cases, transition trees are generated on the server and less processing is required of client 410. In some embodiments, client 410 may be configured to generate or modify transition trees, as necessary.

Each of user navigation module 412, video display module 414, transition tree module 416 and video generation module 418 may be implemented as software, hardware, firmware, or any combination thereof.

Figure 7:
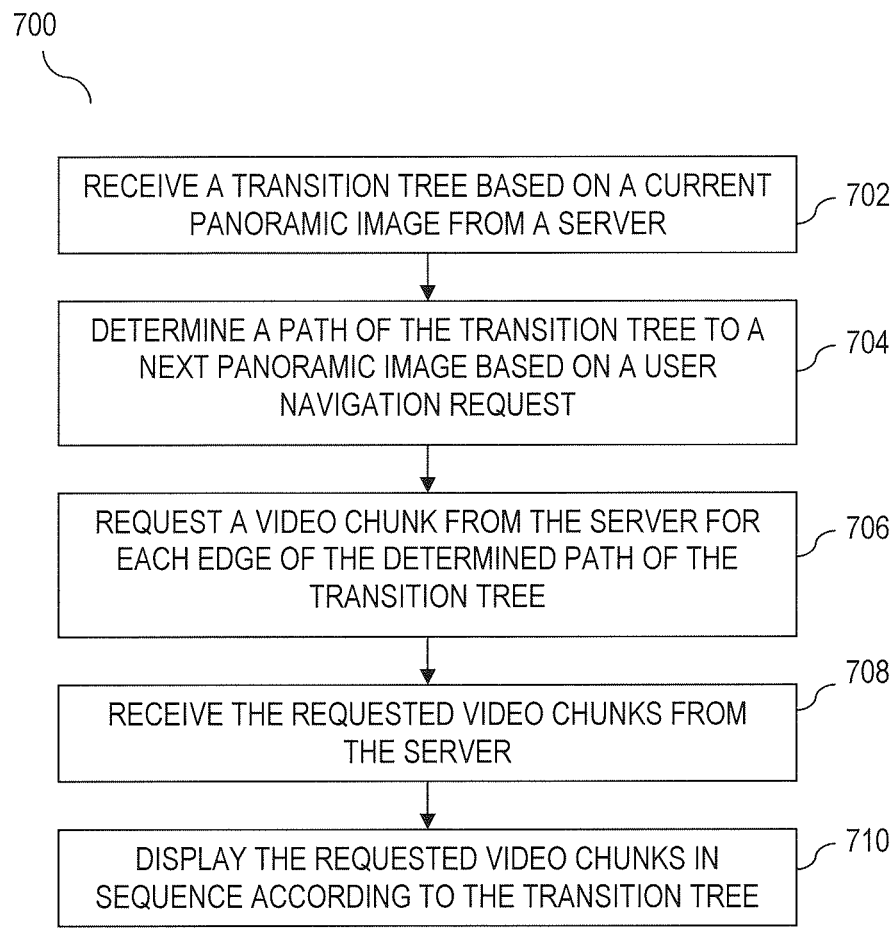
FIG. 7 is a flowchart illustrating a method for generating a video from panoramic images according to an embodiment.

FIG. 7 is a flowchart of exemplary method 700 for generating video from panoramic images according to an embodiment of the present invention. While method 700 is described with respect to an embodiment of the present invention, method 700 is not meant to be limiting and may be used in other applications. In an example, method 700 may be used to generate videos from panoramic images, like system 400 of FIG. 4. However, method 700 is not meant to be limited to system 400. As shown in FIG. 7, exemplary method 700 begins at stage 702 where a transition tree based on a current panoramic image is received from a server, such as server 420 of system 400. In most cases, transition trees may be automatically received with panoramic images.

At stage 704, a path of the transition tree may be determined from the current panoramic image to a next panoramic image based on a user navigation request. This determination may be made based on any number of various factors, as described above.

At stage 706, a video chunk for each edge of the determined path of the transition tree may be requested from the server. Requests may involve chunk ids or URLs, as described above. Stages 702-706 may be performed by transition tree module 416.

At stage 708, requested video chunks are received. In some cases, prefetched video chunks may be received and stored locally for use in the immediate future. This stage may be performed by video display module 414 or, in some cases, video generation module 418.

At stage 710, the requested video chunks are displayed in sequence according to the transition tree or the determined path of the transition tree. In some cases, video generation module 418 may generate video based on multiple video chunks received from server 420. Video may be displayed using video display module 414.

Figure 6:
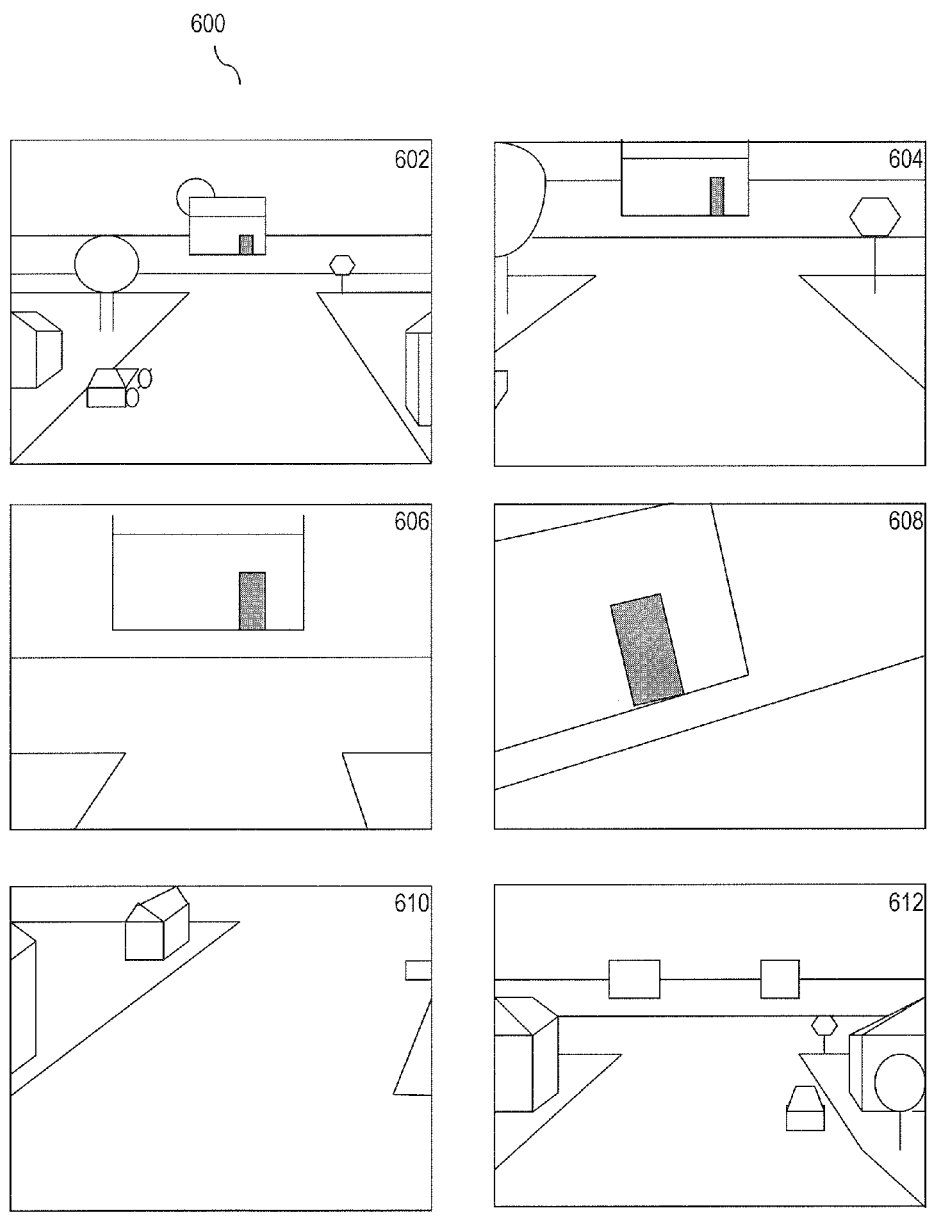
FIG. 6 illustrates a generated sequence of video according to an embodiment.

FIG. 6 shows an example sequence of generated video using a transition tree. In an independent example, image 602 may correspond to a root node of a transition tree. Image 612 may correspond to another node in a determined path of the transition tree. Images 604-610 may represent a received video chunk corresponding to an edge between the two nodes.

Stages 702-710 may be implemented as software, hardware, firmware, or any combination thereof.

In some cases, navigation routes may involve longer distances. According to a further embodiment, transition tree module 416 may request and receive a directional parameter from server 420 or another navigational server.

This directional parameter may include one or more parameters, including a driving direction or information relevant to selecting another panoramic image. A next panoramic image may be determined based on the directional parameter. In some cases, this panoramic image may be further away than a local group of nearby images. This determination may be made using a current transition tree and/or transitional trees of other panoramic images. Intermediate panoramic images may also be determined, if necessary. The determined or selected panoramic image or images may be received with associated transition trees. At this point, the method may proceed at stage 704.

Although the examples provided above may have referred to a navigation route along streets, embodiments of the invention are not limited to street-based routes or geographical locations. Some applications of the described embodiments may involve routes along foot paths or within buildings. Other fields of use for this invention may include medicine, science, engineering, the military, athletics or any other field having similar requirements.

The summary and abstract sections may set forth one or more but not all exemplary embodiments of the present invention as contemplated by the inventor(s), and thus, are not intended to limit the present invention and the appended claims in any way.

Embodiments of the present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for generating a video from panoramic images comprising:
   receiving a transition tree corresponding to a current panoramic image from a server, the transition tree having multiple nodes including a first node associated with the current panoramic image and other nodes corresponding to nearby panoramic images in the transition tree, and has two or more decision paths in the transition tree that extend between the first node and the other nodes corresponding to nearby panoramic images for transitioning to the nearby panoramic images;
   determining a path in the transition tree to a next panoramic image based on a user navigation request, wherein the path is determined based at least on a comparison of image weather conditions between the current panoramic image and the nearby panoramic images in the transition tree;
   requesting a video chunk from the server for each edge of the determined path in the transition tree;
   receiving the requested video chunks from the server; and
   displaying the requested video chunks in sequence according to the determined path in the transition tree.

2. The computer-implemented method of claim 1, wherein the displaying includes displaying each received video chunk upon arrival from the server and wherein the displaying begins prior to receiving all requested video chunks from the server.

3. The computer-implemented method of claim 1, wherein the path determining in the transition tree comprises establishing the current panoramic image as the root node of the received transition tree.

4. The computer-implemented method of claim 3, wherein the path determining in the transition tree further comprises back tracing a path from a destination node in the user navigation request to the root node.

5. The computer-implemented method of claim 1, wherein the path determining in the transition tree is based on times of panoramic images associated with nodes of the transition tree.

6. The computer-implemented method of claim 1, wherein the path determining in the transition tree is based on lighting conditions of panoramic images associated with nodes of the transition tree.

7. The computer-implemented method of claim 1, wherein the path determining in the transition tree is based on camera positions of panoramic images associated with nodes of the transition tree.

8. The computer-implemented method of claim 1, wherein the path determining in the transition tree is based on a shortest path in the transition tree.

9. The computer-implemented method of claim 1, further comprising:
   prefetching a video chunk during an idle time.

10. The computer-implemented method of claim 1, further comprising:
    requesting a directional parameter from a navigation server based on the user navigation request;
    receiving the directional parameter from the navigation server;
    determining a next panoramic image based on the directional parameter;
    requesting the next panoramic image; and
    receiving the next panoramic image and a transition tree associated with the next panoramic image.

11. The computer-implemented method of claim 1, wherein the determining further comprises:
    comparing lighting conditions between the current panoramic image and the nearby panoramic images in the transition tree; and
    selecting a decision path based on the comparison.

12. A system for generating a video from panoramic images comprising:
    a transition tree module implemented on a computing device having hardware, and configured to:
       receive a transition tree corresponding to a current panoramic image from a server, the transition tree having multiple nodes including a first node associated with the current panoramic image and other nodes corresponding to nearby panoramic images in the transition tree, and has two or more decision paths in the transition tree that extend between the first node and the other nodes corresponding to nearby panoramic images for transitioning to the nearby panoramic images;
       determine a path in the transition tree to a next panoramic image based on a user navigation request, wherein the path is determined based on at least a comparison of image weather conditions between the current panoramic image and the nearby panoramic images in the transition tree;
       request a video chunk from the server for each edge of the determined path in of the transition tree; and
    a video display module implemented on a computing device having hardware, and configured to receive the requested video chunks from the server and display the requested video chunks on a display in sequence according to the determined path in the transition tree.

13. The system of claim 12, wherein the video display module is configured to display each received video chunk upon arrival from the server and begin the displaying prior to receiving all requested video chunks from the server.

14. The system of claim 12, wherein the transition tree module is further configured to establish the current panoramic image as the root node of the received transition tree.

15. The system of claim 14, wherein the transition tree module is further configured to back trace a path in the transition tree from a destination node in the user navigation request to the root node.

16. The system of claim 12, wherein the transition tree module is further configured to determine the path in the transition tree based on times of panoramic images associated with nodes of the transition tree.

17. The system of claim 12, wherein the transition tree module is further configured to determine the path in the transition tree based on lighting conditions of panoramic images associated with nodes of the transition tree.

18. The system of claim 12, wherein the transition tree module is further configured to determine the path in the transition tree based on camera positions of panoramic images associated with nodes of the transition tree.

19. The system of claim 12, wherein the transition tree module is further configured to determine the path in the transition tree based on a shortest path in the transition tree.

20. The system of claim 12, wherein the video display module is further configured to prefetch a video chunk during an idle time.

21. The system of claim 12, wherein the transition tree module is further configured to:
- request a directional parameter from a navigation server based on the user navigation request;
- receive the directional parameter from the navigation server;
- determine a next panoramic image based on the directional parameter;
- request the next panoramic image; and
- receive the next panoramic image and a transition tree associated with the next panoramic image.

22. The system of claim 12, wherein the transition tree module is further configured to compare lighting conditions between the current panoramic image and the nearby panoramic images in the transition tree and select a decision path based on the comparison.

23. A system for generating a video from panoramic images comprising:
- a client, implemented on a computing device having hardware, configured to:
  - receive a transition tree corresponding to a current panoramic image from a server, the transition tree having multiple nodes arranged in a tree data structure, including a first node associated with the current panoramic image and other nodes corresponding to nearby panoramic images in the transition tree, and has two or more decision paths in the transition tree that extend between the first node and the other nodes corresponding to nearby panoramic images for transitioning to the nearby panoramic images,
  - determine a path in the transition tree to a next panoramic image based on a user navigation request, wherein the path is determined based at least on a comparison of image weather conditions between the current panoramic image and the nearby panoramic images in the transition tree;
  - request a video chunk from the server for each edge of the determined path in the transition tree; and
  - output the requested video chunks received from the server on a display in sequence according to the determined path in the transition tree.

24. The system of claim 23, wherein the client is further configured to compare lighting conditions between the current panoramic image and the nearby panoramic images in the transition tree and select a decision path based on the comparison.

* * * * *